(12) United States Patent
Hockett et al.

(10) Patent No.: US 11,044,154 B2
(45) Date of Patent: *Jun. 22, 2021

(54) CONFIGURATION AND USAGE PATTERN OF A CLOUD ENVIRONMENT BASED ON ITERATIVE LEARNING

(71) Applicant: International Business Machines Corporation, Armonk, NY (US)

(72) Inventors: Hugh E. Hockett, Raleigh, NC (US); Christopher M. Laffoon, Durham, NC (US); Giribabu V. Paramkusham, Morrisville, NC (US); Keith Rafferty, Wake Forest, NC (US); James C. Riordan, Raleigh, NC (US); Harish Sukhwani, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/395,528

(22) Filed: Apr. 26, 2019

(65) Prior Publication Data

US 2019/0253311 A1    Aug. 15, 2019

Related U.S. Application Data

(63) Continuation of application No. 15/478,762, filed on Apr. 4, 2017, now Pat. No. 10,389,586.

(51) Int. Cl.
*H04L 12/24* (2006.01)
*G06N 5/04* (2006.01)
(Continued)

(52) U.S. Cl.
CPC ............ *H04L 41/082* (2013.01); *G06N 5/04* (2013.01); *G06N 20/00* (2019.01);
(Continued)

(58) Field of Classification Search
CPC ...... H04L 41/50; H04L 41/082; H04L 41/084; H04L 41/5019; H04L 41/5045;
(Continued)

(56) References Cited

U.S. PATENT DOCUMENTS 8,739,157 B2    5/2014    Ho et al.
8,832,013 B1 *  9/2014    Adams ............... G06N 5/04
                                             706/46
(Continued)

OTHER PUBLICATIONS

Abawajy et al, "Establishing trust in hybrid computer environments," in 2011 IEEE 10th International Conference on Trust, Security, and Privacy in Computing and Communications, Nov. 16, 2011 (pp. 118-125), IEEE (Year: 2011).
(Continued)

*Primary Examiner* — John A Follansbee
*Assistant Examiner* — James N Fiorillo
(74) *Attorney, Agent, or Firm* — VanLeeuwen & VanLeeuwen; Christopher M. Pignato

(57) ABSTRACT

An approach is provided in which a system displays a user interface that includes cloud environment configuration parameters on a display. Each of the cloud environment configuration parameters is selectable by a user and corresponds to a new cloud environment. The system receives a set of user selections from the user that selects at least one of the cloud environment configuration parameters. Then, the system generates a recommended cloud profile based, at least in part, on the set of user selections, and configures the new cloud environment based on the recommended cloud profile.

14 Claims, 8 Drawing Sheets

(51) Int. Cl.
    *H04L 29/08*     (2006.01)
    *G06N 20/00*     (2019.01)
    *H04L 12/26*     (2006.01)

(52) U.S. Cl.
    CPC .......... *H04L 41/5041* (2013.01); *H04L 67/10* (2013.01); *H04L 67/30* (2013.01); *H04L 41/14* (2013.01); *H04L 41/16* (2013.01); *H04L 41/5096* (2013.01); *H04L 43/08* (2013.01)

(58) Field of Classification Search
    CPC ............. H04L 41/5048; H04L 41/5051; H04L 41/5096; H04L 41/16; H04L 41/22; H04L 67/12; H04L 67/36; H04L 43/02; H04L 43/062; H04L 67/61; H04L 67/30; H04L 43/00; H04L 43/08; H04L 45/02; H04L 12/24; H04L 12/26; H04L 29/08; G06F 9/507; G06F 9/5011; G06F 9/5077; G06F 9/45533; G06F 9/45558; G06F 9/46; G06F 16/10; G06F 16/20; G06N 20/00; G06N 5/04; H04W 4/38
    USPC .......................................... 709/202, 221–226
    See application file for complete search history.

(56) References Cited

U.S. PATENT DOCUMENTS

| | | | |
|---|---|---|---|
| 8,832,239 B2 | 9/2014 | Assuncao et al. | |
| 8,914,515 B2 | 12/2014 | Alapati et al. | |
| 8,924,539 B2 | 12/2014 | Ferris et al. | |
| 9,286,586 B2 | 3/2016 | Kern et al. | |
| 9,552,232 B2 | 1/2017 | Mukherjee et al. | |
| 2006/0149608 A1* | 7/2006 | Asgari | G06N 20/00 703/2 |
| 2011/0295999 A1* | 12/2011 | Ferris | G06F 9/5072 709/224 |
| 2012/0060142 A1* | 3/2012 | Fliess | G06F 11/3428 717/102 |
| 2012/0147894 A1* | 6/2012 | Mulligan | H04L 41/5048 370/395.53 |
| 2013/0227089 A1* | 8/2013 | McLeod | G06F 9/45558 709/220 |
| 2013/0304903 A1* | 11/2013 | Mick | H04L 67/10 709/224 |
| 2014/0040656 A1* | 2/2014 | Ho | G06F 11/3093 714/3 |
| 2014/0047227 A1* | 2/2014 | Breternitz | G06F 9/5066 713/2 |
| 2014/0173112 A1* | 6/2014 | Seago | H04L 67/32 709/226 |
| 2014/0279201 A1* | 9/2014 | Lyoob | G06F 9/5077 705/26.7 |
| 2014/0280946 A1* | 9/2014 | Mukherjee | H04L 41/084 709/226 |
| 2014/0280966 A1* | 9/2014 | Sapuram | H04L 41/5054 709/226 |
| 2014/0365662 A1* | 12/2014 | Dave | G06Q 30/02 709/226 |
| 2015/0019301 A1 | 1/2015 | Jung | |
| 2015/0067171 A1* | 3/2015 | Yum | H04L 67/2809 709/226 |
| 2015/0156065 A1* | 6/2015 | Grandhe | H04L 41/5054 709/224 |
| 2015/0172204 A1* | 6/2015 | Anderson | H04L 47/70 709/224 |
| 2015/0206207 A1* | 7/2015 | Narasimhan | G06Q 30/0283 705/400 |
| 2015/0222723 A1* | 8/2015 | Adapalli | G06Q 10/067 705/26.41 |
| 2015/0341230 A1* | 11/2015 | Dave | H04L 41/5051 705/7.29 |
| 2016/0043906 A1* | 2/2016 | Mithani | G06F 3/04842 715/736 |
| 2016/0070597 A1* | 3/2016 | Riggin | G06F 9/5077 718/1 |
| 2017/0024240 A1* | 1/2017 | Black | G06F 3/0608 |
| 2017/0126703 A1* | 5/2017 | Ujiie | H04L 63/08 |
| 2017/0142027 A1* | 5/2017 | Teter | H04L 47/805 |
| 2017/0279692 A1* | 9/2017 | Llagostera | G06F 8/60 |
| 2017/0329330 A1* | 11/2017 | Hatano | G05D 1/021 |
| 2017/0353531 A1* | 12/2017 | Conn | H04L 67/2861 |
| 2018/0032362 A1* | 2/2018 | Buil | H04L 67/10 |
| 2018/0115468 A1* | 4/2018 | Bildhauer | H04L 41/5058 |
| 2018/0260200 A1* | 9/2018 | Karagiannis | H04L 41/5096 |
| 2018/0266716 A1* | 9/2018 | Bender | F24F 11/63 |
| 2018/0287864 A1 | 10/2018 | Hockett et al. | |
| 2019/0370139 A1* | 12/2019 | Vichare | H04L 41/082 |
| 2019/0386910 A1* | 12/2019 | Yang | H04L 45/24 |

OTHER PUBLICATIONS

Anonymous, "A 'Cloud Sourcing' that Recommends the Optimal Resource Configuration Based on a Cloud Workload's Attributes," IP.com, IP.com No. IPCOM000236263D, Apr. 15, 2014, 6 pages.

Habib et al., "Cloud computing landscape and research challenges regarding trust and reputation," in 2010 7th International Conference on Ubiquitous Intelligence & Computing and 7th International Conference on Autonomic & Trusted Computing, Oct. 26, 2010 (pp. 410-415), IEEE (Year: 2010).

Pop et al., "Reputation guided genetic scheduling algorithm for independent tasks in inter-clouds environments," in 2013 27th International Conference on Advanced Information Networking and Applications Workshops, Mar. 25, 2013 (pp. 772-776), IEEE (Year: 2013).

"List of IBM Patents or Patent Applications Treated as Related," Letter from Leslie A. Van Leeuwen, Apr. 26, 2019, 1 page.

* cited by examiner

User Interface 600

| REQUIREMENTS | VALUE | 620 | FIXED 630 | WEIGHTING 640 |
|---|---|---|---|---|
| Software Cost | —+— 610 | ☐ | X | ☐ |
| Hardware Cost | ——+ | ☐ | ☐ | H |
| Quality of Service | —+—— | ☐ | ☐ | L |
| HA of Workloads | ——+— | ☐ | ☐ | M |
| HA of Cloud Management | ——+— | ☐ | X | ☐ |
| Deployment Time | —+—— | ☐ | X | ☐ |
| Required # of Deployments | —+——— | ☐ | X | ☐ |
| Required Amount of Storage | ———+— | ☐ | ☐ | H |
| Hardware Limitations | Selection Tools — 650 | | | |
| Pattern Types or Usages | Selection Tools — 660 | | | |
| Public Cloud Provider Restrictions | Selection Tools — 670 | | | |

Cloud Preference 680

| | | | |
|---|---|---|---|
| DR | ☐ | ☐ | ☐ |
| Multi-Rack | ☐ | ☐ | ☐ |
| On-Premise | ☐ | X | L |
| Off-Premise | ☐ | ☐ | ☐ |
| Hybrid | X | ☐ | M |

SUBMIT    CANCEL

*FIG. 6*

810
Cloud group High Availability (HA) requires 2 or more compute nodes in the group (from expert rule).
Config: 2 or more compute nodes in a cluster
Impact: enables HA
Relationship: boolean - if only 1 compute node in a cluster, then HA is disabled.
Relationship correlation coefficient : 1.0 = 100% - manually entered
Statistically significant weight: 1.0 (meaning 100% - this is a requirement for this config, as entered by an expert)
Causality weight: 1.0 (meaning 100% - this configuration (2 nodes) impacts this value (HA))

820
CPU increase is related to deploy speed (from extrapolated data)
Config: CPU speed (GHz * cores) on the target host
Impact: deploy time
Relationship: deploy time is an inverse and asymptotical relation to CPU on the target host. Meaning as CPU speed increases, deploy time decreases. The graph is asymptotical described by this equation set....
Relationship correlation coefficient : 0.9
Statistically significant weight: 0.9 (90% of the stored profiles contain data on this config setting (cpu speed of host) and this measured impact (deploy time))
Causality weight: 0.8 (80% certain that this relationship is not impacted by other configuration options based on the fact that similar profiles where this is the only difference in configuration)

830
Hardware cost is related to storage capacity (from extrapolated data)
Config: storage capacity size
Impact: cost (calculated)
Relationship: cost is linearly related to storage capacity. As storage capacity increases, cost goes up linearly.
Relationship correlation coefficient : 0.95 (the equation matches the known data points well)
Statistically significant weight: 0.1 (10% of profiles contain enough data to calculate this, implying the sample size is small)
Causality weight: 0.3 (30% certain this is true. Within the repository, profiles vary too many other parameters to imply this is the only factor in cost.)

*FIG. 8*

CONFIGURATION AND USAGE PATTERN OF A CLOUD ENVIRONMENT BASED ON ITERATIVE LEARNING

BACKGROUND

Cloud-computing providers offer various services according to different models, such as Infrastructure as a Service (IaaS), Platform as a Service (PaaS), and Software as a Service (SaaS). These models offer increasing abstraction and are typically portrayed as a layers in a stack, where IaaS is a bottom layer, PaaS is a middle layer, and SaaS is a top layer. The models may also be used independent of each other.

IaaS cloud providers supply resources on-demand from large pools of equipment installed in data centers and typically bill services on a utility computing basis where a customer's cost is based on the amount of resources allocated and consumed. Cloud management solutions are available to customers that include system management and pattern engine capabilities to enable workload deployments in an IaaS environment. Some cloud management solutions allow a system administrator to select their own hardware (network/storage/compute) and virtualization software (hypervisors, etc.) to create their own cloud environment. This presents a unique challenge for customers when they have a large selection of hardware and software from which to configure for executing their specific workloads and requirements.

As used herein, the term "cloud environment" encompasses hardware, software (including hardware and software configuration), networking, and executing workloads. A cloud environment may include software at all three levels discussed above (IaaS, PaaS, and SaaS), may include information associated with a public cloud provider account, and may include an entire "rack" or datacenter in an on-premise private cloud. The way in which a cloud environment operates is typically subject to a numerous set of configurable parameters that typically include the following: hardware selection (CPU, disk, network cards, memory, routers/switches, etc.), firmware level selection, BIOS configuration, operating system selection for each hardware component, operating system configuration, virtualization software selection and configuration, and pattern deployment software/configuration. Within each of these components, configurable parameters are typically documented in a specific component's documentation.

A typical software virtualization software product may have hundreds of cloud-related configuration options (sometimes herein referred to as a "cloud environment configuration parameters"). A cloud environment configuration parameter, as that term is used herein, refers to a configurable setting of a cloud environment where the setting relates specifically to the fact that cloud is being used. For example, when an IT professional chooses a preference as far as which cloud is used to perform a given employee's computing work, then that is a cloud environment configuration parameter. As a further example, when an IT professional chooses which login options (for example, normal user, power user, administrator) with which a given employee will be presented by her cloud environment at startup time, then this is not a cloud environment configuration parameter because it does not specifically relate to cloud usage (except in the trivial sense that the setting happens to be present in a cloud environment implementation end user application). Configurable parameters that do not specifically relate to cloud usage are herein referred to as non-cloud configuration parameters. Cloud environment configuration parameters and non-cloud configuration parameters are herein collectively referred to simply as "configuration parameters."

Typically, the configuration parameters of a cloud environment are manually configured for each component based on a system administrator's cloud requirements by those skilled in the specific component, which often requires multiple experts across various disciplines. The cloud requirements are created and manually maintained by the system administrator and only changed over time as the system administrator deliberately modifies the cloud requirements. The process of mapping the cloud requirements to specific configuration settings of components are contained within various components' reference documentation or derived from experts in the field.

BRIEF SUMMARY

According to one embodiment of the present disclosure, an approach is provided in which a system displays a user interface that includes cloud environment configuration parameters on a display. Each of the cloud environment configuration parameters is selectable by a user and corresponds to a new cloud environment. The system receives a set of user selections from the user that selects at least one of the cloud environment configuration parameters. Then, the system generates a recommended cloud profile based, at least in part, on the set of user selections, and configures the new cloud environment based on the recommended cloud profile.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

According to an aspect of the present invention there is a method, system and/or computer program product that performs the following operations (not necessarily in the following order): (i) displaying a user interface comprising a plurality of cloud environment configuration parameters on a display, wherein each of the plurality of cloud environment configuration parameters is selectable by a user and corresponds to a new cloud environment; (ii) receiving a set of user selections from the user that selects at least one of the plurality of cloud environment configuration parameters; (iii) generating a recommended cloud profile based, at least in part, on the set of user selections; and (iv) configuring the new cloud environment based on the recommended cloud profile.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 6 is diagram depicting an example of a user interface that allows a system administrator to enter system administrator requirements;

FIG. 8 is a diagram depicting examples of configuration-to-impact mappings.

DETAILED DESCRIPTION

Figure 1:
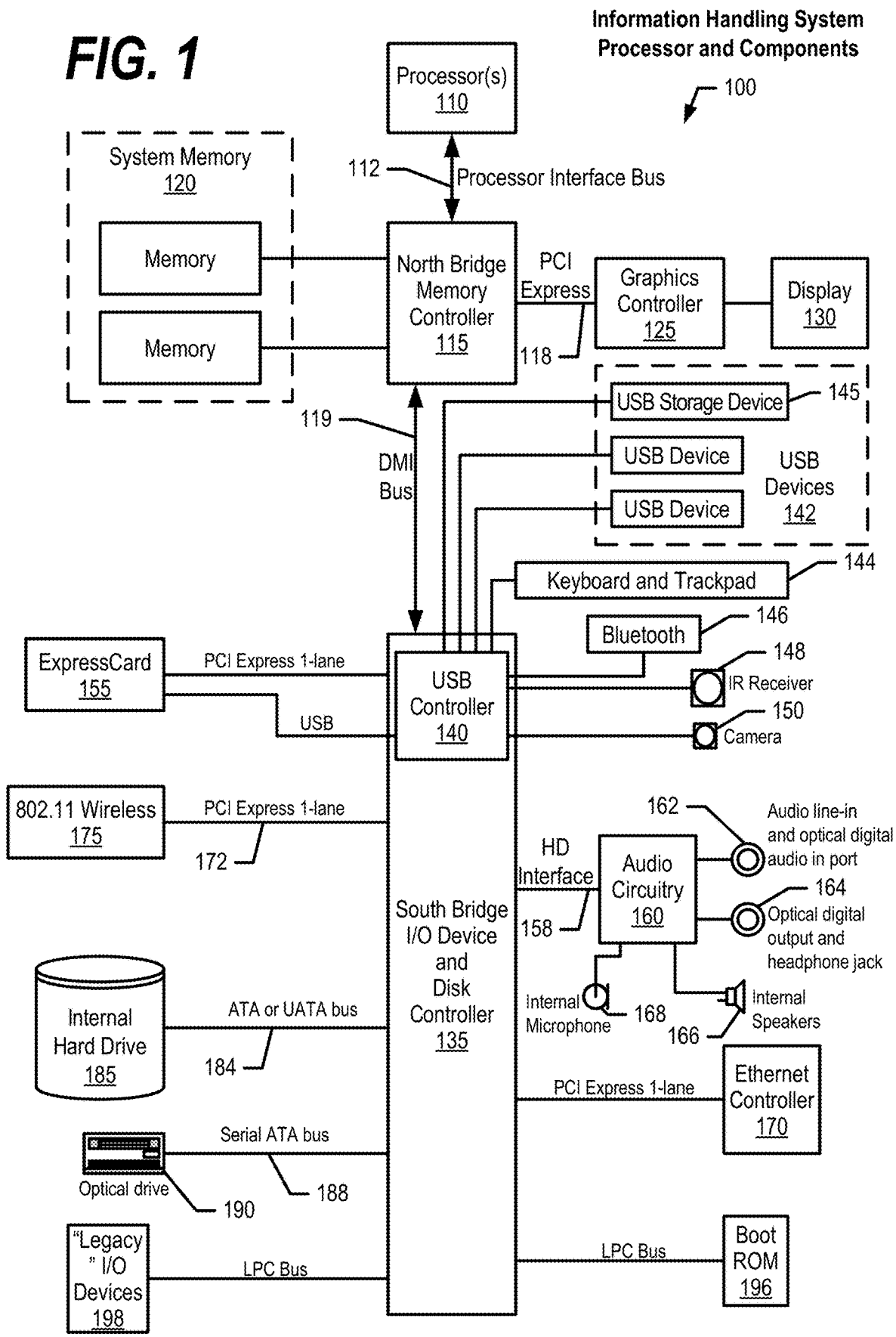
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
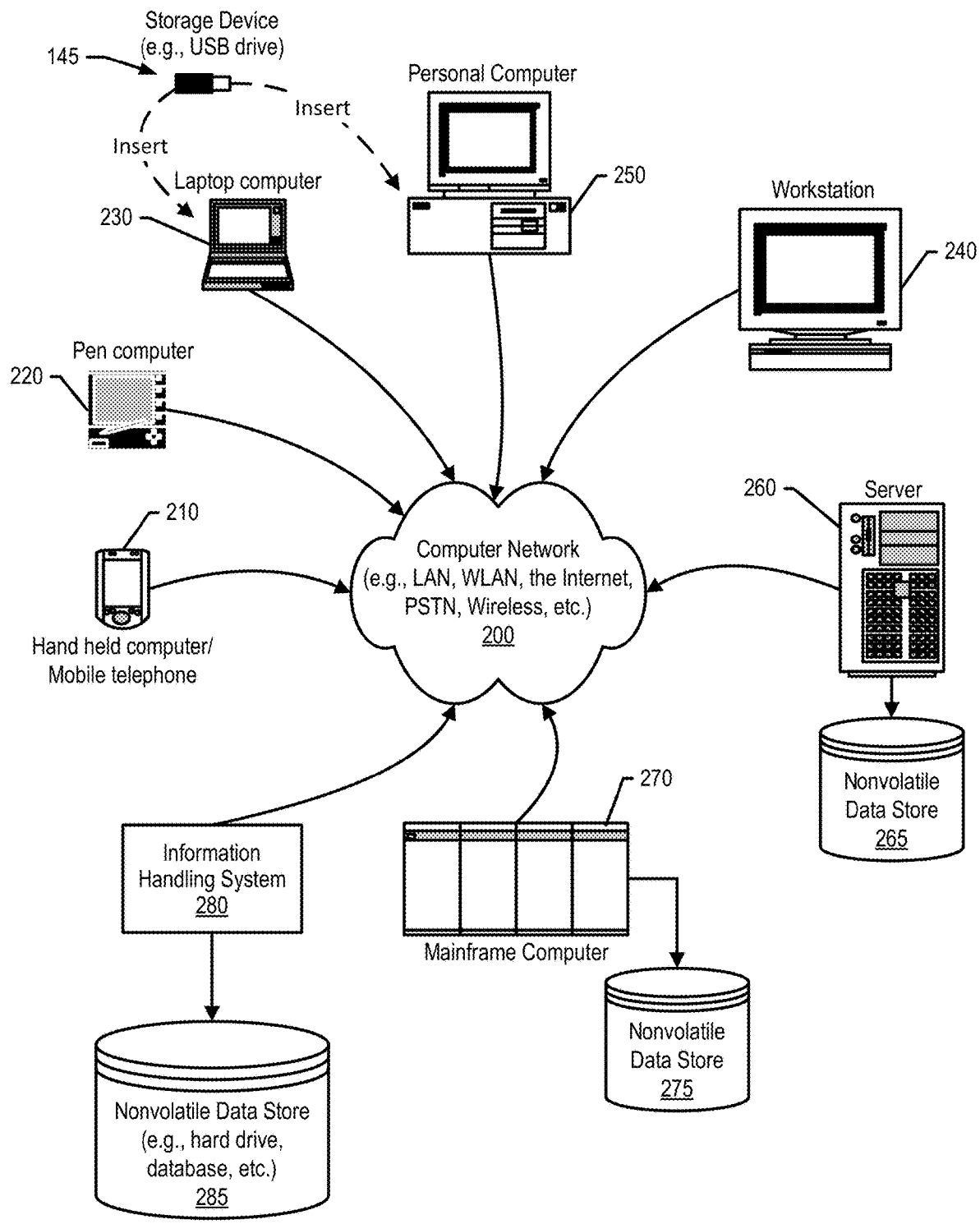
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 8 depict an approach that can be executed on an information handling system to provide optimal cloud configuration recommendations to a system administrator based analyzing a system administrator's requirements against verified crowd-sourced cloud performance metrics. As discussed above, system administrators may be faced with a challenge of configuring their cloud environment when they are faced with a large selection of hardware and software options and, in turn, may not configure their cloud environment optimally for their specific needs. The information handling system discussed herein determines an optimal cloud setup and usage by comparing the system administrator's cloud specific criteria against verified real-world performance data of existing cloud environments.

The information handling system crowd-sources existing cloud configurations with cloud performance metrics and uses the crowd-sourced data to intelligently recommend new cloud configurations based on complex system administrator requirements. The information handling system then automatically implements the new configuration after system administrator authorization and allows cloud agents to measure the cloud performance metrics of the new cloud environment, which the information handling system adds to the pool of crowd-sourced data. This process allows the information handling system to continuously iterate and implement new cloud environment configurations and, over time, provide optimal matching cloud configuration recommendations for a given system administrator's requirements, even those configurations that were not previously modifiable with the prior art after an initial cloud configuration, such as selecting different hardware, storage, or cloud provider.

Some embodiments of the present invention may include one, or more, of the following features, characteristics, operations and/or advantages: (i) helps a system administrator construct her own private cloud using a certain set of hardware and software options available to the system administrator (for example, three virtual machines (VMs) with 8 GB of Random Access Memory (RAM), four Central Processing Units (CPUs), and 200 GB of disk, etc.); (ii) the system administrator inputs a certain set of available hardware options that she has in her datacenter, available infrastructure software/hypervisors/firmware versions available, the desired workload to run and characteristics to achieve; (iii) based upon the system administrator input of hardware options, machine logic according to the present invention outputs an optimal configuration based on data collected from other "private" cloud system administrators; (iv) the system administrator then has the ability to vary the hardware and software inputs to see what the configured solution would look like based on crowd sourced data (and interpolating between the collected data); (v) the system administrator has the ability to vary the hardware specifications and software input and see projected outputs; (vi) tests recommended configurations, applies them to available systems, and varies configuration parameters on the system in an effort to recursively search for more optimal configurations and expand the configuration data pool; (vii) provide an optimal cloud configuration based on several parameters, including application performance target, existing hardware; (viii) takes into account some unique system administrator requirements such as backup/restore and HA (High Availability) capabilities and QoS (Quality of Service) requirements; (ix) based on system administrator's existing hardware inventory, provides recommendations on hardware upgrades; (x) takes inputs from crowd-sourced data and predictions relating to application performance to generate a recommended configuration; (xi) recursively improves recommendations for each configuration item to provide a final configuration that corresponds to a current best known profile; (xii) cloud source data is applied to a particular system administrator specifications to gain further insights on the system administrator's ability to vary the hardware specs and software input and see projected outputs; (xiii) uses crowd-sourced data as the input to a rule based recommendation engine to map with the system administrator requirements; (xiv) provides ability for the system administrator to vary the hardware specifications and software input to see projected outputs; (xv) recursively improves matching recommendations via auto-implementation and automatic metric evaluation; (xvi) eliminates potential recommendations that are not considered optimal; (xvii) recursively improves recommendations; and/or (xviii) based on recursively improved recommendations, creates a Master Crowd Data Repository that is used to come up with a short list of optimized recommendations unique to the system administrator specifications (hardware/software/workload requirements).

Figure 3:
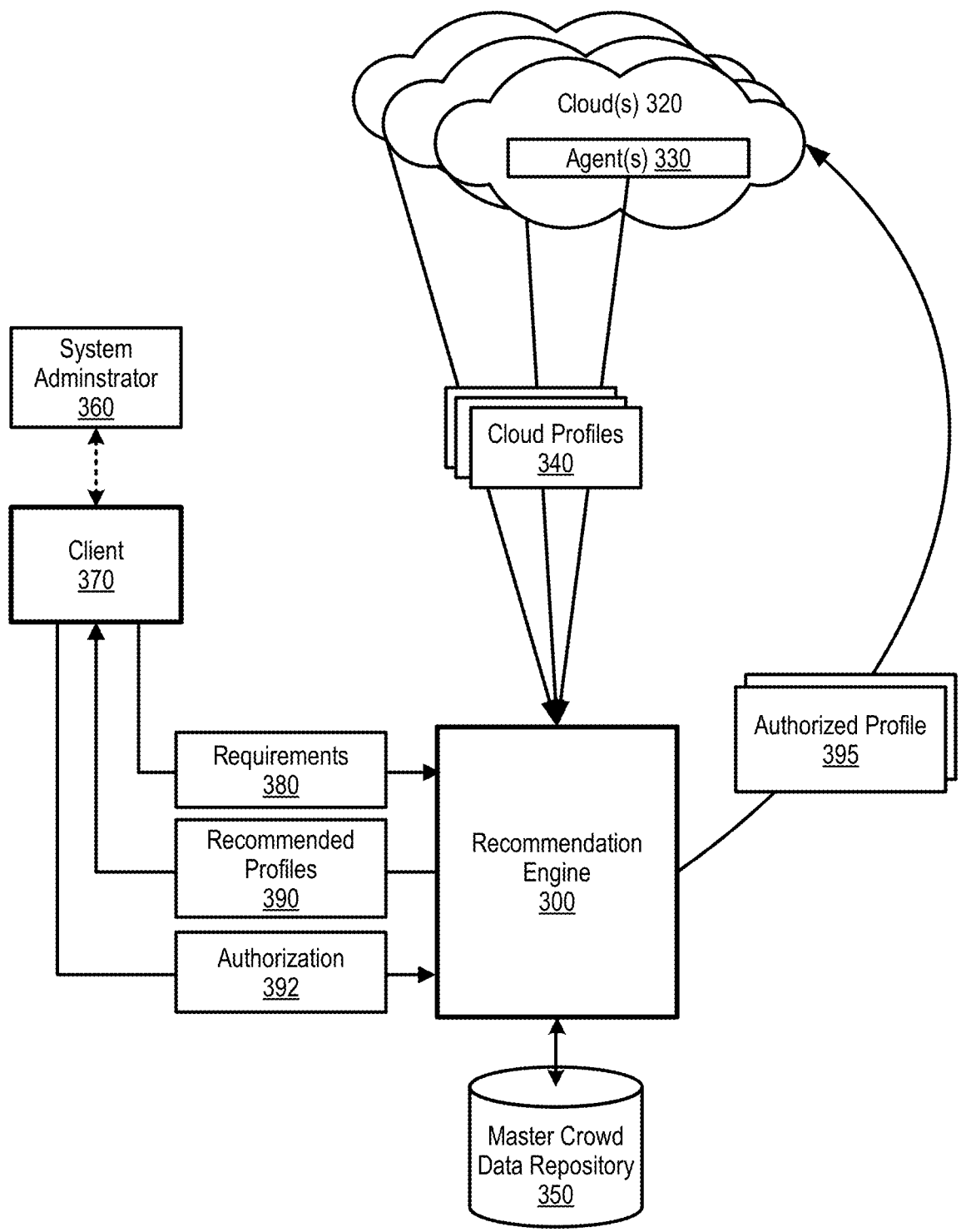
FIG. 3 is a high-level diagram depicting an example of a recommendation engine providing optimized could profile recommendations based on iterative learning and implementing the optimized cloud profile recommendations.

FIG. 3 is a high-level diagram depicting an example of a recommendation engine providing optimized cloud profile recommendations based on iterative learning and implementing the optimized could profile recommendations. Each of clouds 320 includes an agent 330 that measures cloud performance metrics corresponding to the performance of their particular cloud 320. Recommendation engine 300 receives cloud profiles 340 from agents 330, which includes the cloud performance metrics as wells as cloud hardware records, configuration records, and usage information. Recommendation engine 300 stores cloud profiles 340 in master crowd data repository 350.

System administrator 360 uses client 370 to provide cloud requirements 380 to recommendation engine 300. In one embodiment, system administrator 360 uses a user interface such as user interface 600 shown in FIG. 6 to enter the cloud requirements. Cloud requirements 380 may include (i) overall cost, (ii) quality of service (QoS), (iii) high availability (HA), (iv) disaster recovery (DR), (v) deploy time, (vi) hardware limitations, (vii) historical or anticipated volume of workload data communications/transactions, (viii) software applications that will be used in the cloud environment, (ix) cloud security clearance or rating, (x) encryption/decryption and/or secure transmission path requirements, and (xi) hardware location requirements, each of which is discussed below.

Overall cost is generally specified as both recurring payments and a single payment. For example, when a business orders hardware that includes software from a public cloud provider, the business is charged either upfront and/or a recurring charge. If the business is planning on buying its own hardware for an on premise cloud, the business incurs cost from the hardware and software vendors. Costs may include hardware purchase/lease, software purchase, licenses, usage (if licensing varies the cost is based on usage), and may also include cost of electricity (Watts/month).

Quality of service (QoS) includes performance metrics such as network throughput/latency, benchmark workload results, etc. High availability (HA) is a subset of QoS and may specify an uptime (e.g., 99.999%) and a failover recovery time (e.g., 30 minutes vs 2 seconds). Disaster recovery (DR) specifies a cross datacenter failover measured in downtime. For example, if a business experiences a total power failure at datacenter site A, then site B will be fully operational within 2 hours. Deploy time specifies an amount of time to create a new virtual machine (or set of VMs) and become fully operational. Deploy time may be measured differently for different workloads such as a simple VM bring up (ping the VM) may be measured differently from a full multi-VM product installation bring up (run a monitoring status call on the installed software).

Hardware limitations may specify hardware reuse requirements. For example, if a system administrator has a datacenter with existing hardware that they must reuse, the system administrator may specify the datacenter as a hardware set requirement that identifies the amount of compute nodes with model numbers and specifications. In another example, the hardware limitations may specify a vendor lock-in contract requiring them to buy from a specific vendor.

Historical or anticipated volume of workload data communications and transactions may include information of workloads that typically generate megabytes or petabytes of data, both network transmission rates and storage rates. Software applications that will be used in the cloud environment may indicate, for example, whether users have a history of working with high resolution video footage. The cloud's security clearance or rating may include, for example, compliance with specific security requirements or standards, requiring specific encryption algorithms, specific hardware based encryption modules, network firewall rules, etc. Encryption/decryption and/or secure transmission path requirements may indicate whether communications are needed through a virtual private network. Hardware location requirements may indicate, for example, that a workload must only run in a specific country, etc.

System administrator requirements such as the foregoing may be: (i) selectively applied based on a given system administrator's circumstances; and/or (ii) weighted or ranged according to system administrator 360's requirements. In one embodiment, system administrator 360's process of specifying requirements involves a trade-off matrix of dependent choices such as cost versus performance (see FIG. 6 and corresponding text for further details).

Recommendation engine 300 receives system administrator requirements 380 and, in one embodiment, uses a rule-based engine to intelligently generate new recommended profiles 390 by evaluating subsets of existing cloud profiles 340 as well as intelligently predicting alternate options, such as by extrapolating from a known data set to best fit system administrator requirements 380. Recommended profiles 390 may include recommendations of new or alternate hardware and software based on known data point interpolations and derived hardware statistics beyond what is present in system administrator 360's current cloud environment. Recommendation engine 300 builds in intelligence to create recommended profiles 390 using mappings from configuration options to known results from cloud profiles 340, such as hardware 'X' gives deploy time 'Y'. In one embodiment, recommendation engine 300 may suggest multiple recommended profiles 390 that include intelligent variations of parameters based on variances from cloud profiles 340 stored in master crowd data repository 350.

System administrator 360 evaluates recommended profiles 390 and sends authorization 392 to recommendation engine 300 that selects one or more of recommended profiles 390. In one embodiment, system administrator 360 ranks the recommended profiles 390 for recommendation engine 300 to implement in a particular order until an optimized cloud configuration is achieved. Recommendation engine 300 sends authorized profile 395 to one of agents 330 that correspond to system administrator 360's cloud 320. Agent 330 configures its cloud 320 accordingly, which includes hardware setup, software installation and configuration, workload deployments (benchmark and user defined), and other identified usage best practices.

In one embodiment, each output recommended cloud configuration profile includes everything needed to fully create a cloud and execute workloads. In this embodiment, settings include hardware specifics (including cloud provider, if applicable), firmware levels, software prerequisite levels, software prerequisite configuration settings, cloud management configuration and setup settings, etc.

Over time, agent 330 provides more cloud profiles 340 to recommendation engine 300 based on the new cloud profile and cloud performance metrics, which recommendation engine 300 adds to master crowd data repository 350 and utilizes for subsequent recommendation analysis. In one embodiment, recommendation engine 300 updates its extrapolation algorithm based on the new cloud performance metrics.

Recommendation engine 300 continues to intelligently iterate and refine recommendations to reach an optimal cloud configuration for a system administrator's given requirements. Over time, master crowd data repository 350 obtains best known cloud profiles for each system administrator requirement permutation.

In one embodiment, agents 330 implement a recommendation profile to generate new profiles, which include fully automated process such as hardware allocation, network configuration, storage allocation, software installation of cloud software, and software configuration of cloud software. Agents 330 may also run usage scenarios as described in the recommended profile, run benchmarks workloads, and generate run-time cloud performance metrics from the installation resulting in a new cloud profile, which is automatically exported and sent back to recommendation engine 300.

In another embodiment, agents 330 generate "test case results" from the usage scenarios, which validates hardware and software combinations. If an invalid combination is found or if a usage scenario was generated that failed or is impossible, agents 330 mark the failure in the cloud profile. In yet another embodiment, agents 330 are able to modify an existing installation rather than reinstall the installation from scratch, which allows much faster iterations over similar cloud configuration profiles.

Figure 4:
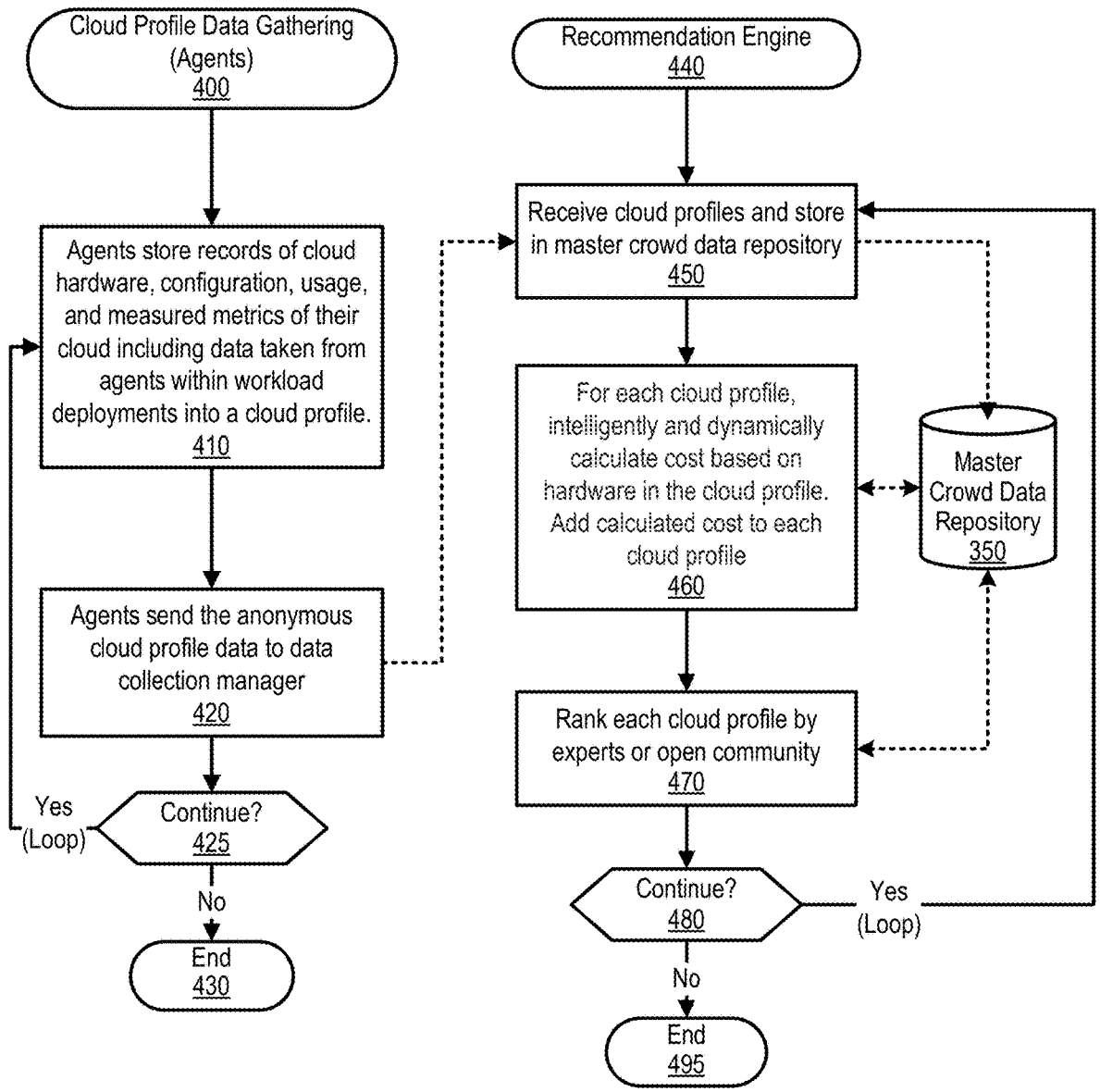
FIG. 4 is a flowchart depicting an example of steps taken to collect cloud profile data from cloud agents.

FIG. 4 is a flowchart depicting an example of steps taken to collect cloud profile data from cloud agents. Cloud agent processing commences at 400 whereupon, at step 410, agents store records of cloud hardware, configuration, usage, and cloud performance metrics of their respective cloud environment. In one embodiment, an agent collects cloud metrics from a cloud manager virtual machine. The cloud manager virtual machine is generally a virtual machine that configures the cloud, deploys new virtual machines, migrates virtual machines, collects and manages metrics from other virtual machines and hypervisor, and performs other cloud related actions. The agent may also collect metrics from other agents running inside of workload virtual machines (or an additional cloud manager). For example, multiple agents may exist in a single cloud and send their data to a cloud manager virtual machine, which then sends the data to the data collection manager. At step 420, the agents send the cloud profile data anonymously to recommendation engine 300.

A determination is made as to whether to continue to collect and send cloud profile data (decision 425). If the agents should continue to collect and send cloud profile data, then decision 425 branches the 'yes' branch, which loops back to continue to collect and send cloud profile data. This looping continues until the agents should stop collecting and sending cloud profile data (e.g., termination), at which point decision 425 branches to the 'no' branch whereupon agent processing thereafter ends at 430.

Recommendation engine processing commences at 440 whereupon, at step 450, the process receives the cloud profiles from the agents and stores the cloud profiles in master crowd data repository 350. At step 460, for each cloud profile, the process intelligently and dynamically calculates cost based on hardware specified in the cloud profile and adds the calculated cost to each cloud profile. In one embodiment, recommendation engine 300 may add the cost to a cloud profile at the time of import when the agent sends the profile from the cloud into the repository as shown. In another embodiment, recommendation engine 300 may also re-calculate the cost if the previously calculated cost is determined to be stale. In this embodiment, the cost calculation may have a time stamp and include multiple costs from various vendors. The cost value may be determined to be stale when vendors update their prices, when new vendors are added/removed, or when the timestamp is older than a certain threshold. When a system administrator sends a request to recommendation engine 300, recommendation engine 300 may update any stale costs of existing cloud profiles based on current market rates, resulting in real-time and dynamic cost calculations over time.

At step 470, in one embodiment, experts and the open community are allowed to rank or rate each cloud profile. After the cloud profile exists in the master crowd data repository 350, the open community (or a privileged subset community/communities of experts) may add metadata to each cloud profile. For example, the metadata may include a general rating (e.g., 0 to 5-star overall rating); ratings in abstract categories (e.g., 5-star for cost, 2-star for performance); or include free-form text comments. In addition, the metadata may be tagged based on the privileged user level (experts say X, general users say Z). Community and expert feedback metadata may then be seen by other system administrators as well as used as input to recommendation engine 300.

A determination is made as to whether to continue to receive cloud profile data from the agents (decision 480). If the recommendation agent should continue to receive cloud profile data, then decision 480 branches the 'yes' branch, which loops back to continue to receive the cloud profile data. This looping continues until the recommendation engine should stop receiving cloud profile data (e.g., termination), at which point decision 480 branches to the 'no' branch whereupon data collection and storage processing thereafter ends at 495.

Figure 5:
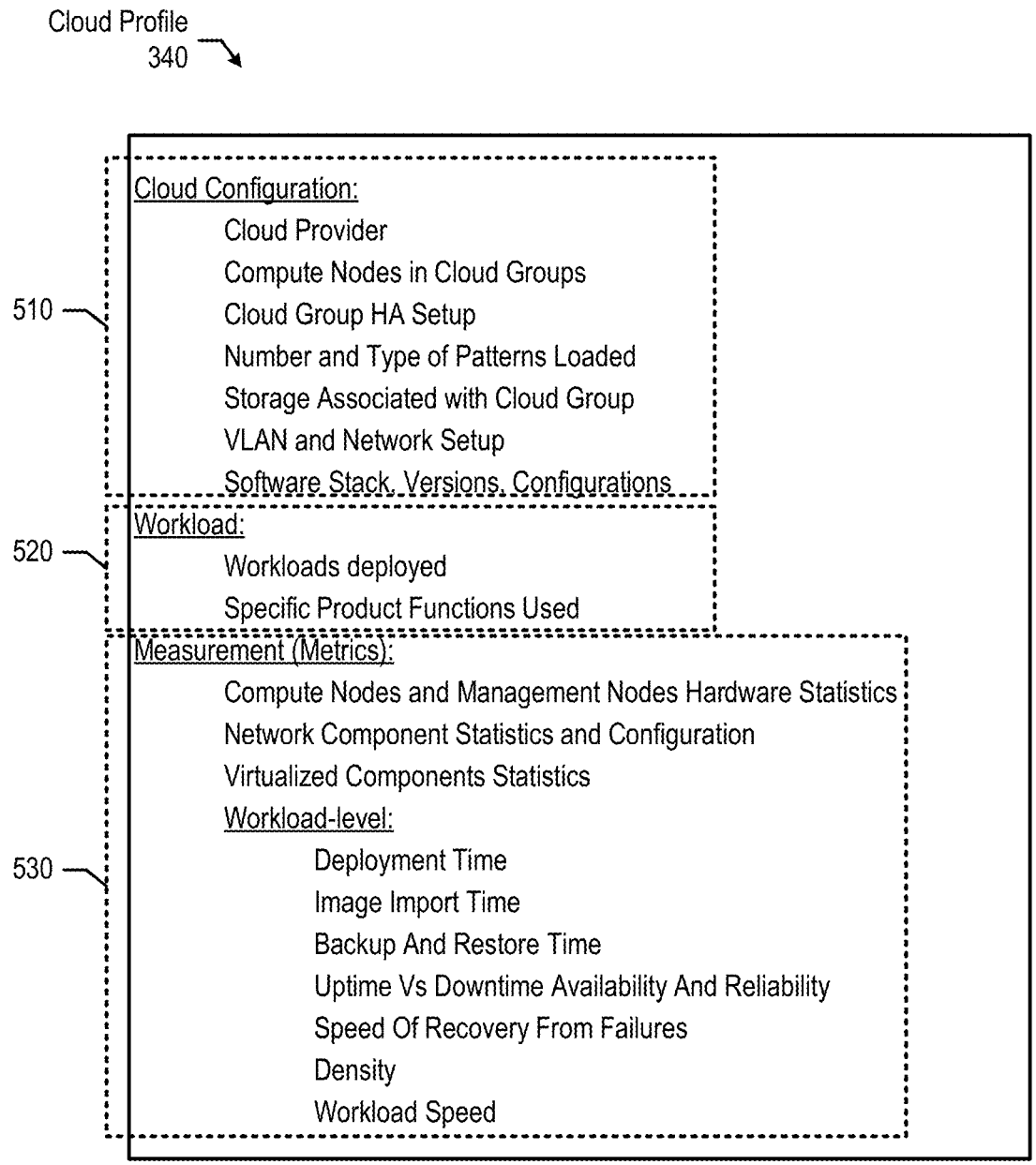
FIG. 5 is an exemplary diagram showing a cloud profile collected from a cloud agent.

FIG. 5 is an exemplary diagram showing a cloud profile collected from a cloud agent. Each of agents 300 creates a cloud profile similar to cloud profile 340 shown in FIG. 5. As those skilled in the art can appreciate more, less, or different entries may be included in a cloud profile than what is shown in FIG. 5.

Cloud profile 340 includes a centralized collection and aggregation of cloud configuration, usage, and cloud performance metrics of verified and measured real-world data. The example shown in FIG. 5 shows that cloud profile 340 includes three sections. Cloud configuration section 510 includes cloud configuration information such as the cloud provider, the number of compute nodes in cloud groups (clusters of compute nodes), the cloud group high availability (HA) setup, the number and type of patterns loaded in the cloud, the virtual local area network (VLAN) and network setup, and software stacks, versions, and configurations (e.g., on premise, hybrid cloud, multi-rack setup, etc.).

Workload section 520 includes workloads deployed such as the number, pattern type, deployment options (e.g., auto scaling enabled, etc.). Workload section 520 may also include specific product functions implemented such as snapshots, virtual machine storage, external disk usage, backups, restores, etc.

Measurement statistics section 530 includes cloud performance metrics in the corresponding cloud based on the cloud configuration and workload shown in sections 510 and 520, respectively. Section 530 includes compute nodes and management nodes hardware statistics such as memory, central processing unit (CPU), disk size and I/O rates. Section 530 also includes network component statistics and configuration such as network cards, speed, firmware levels, etc. Section 530 also includes virtualized components and statistics. For example, if bare-metal hardware is not used, then the virtualized hardware, VM, and/or virtualization host statistics are included.

Section 530 includes a section on workload levels such as deployment time, image import time, backup and restore time, uptime vs downtime availability and reliability (both management and workload), speed of recovery from failures (both management and workload), density (number of deployments per hardware unit), and workload speed.

Recommendation engine 300 intelligently and dynamically calculates cost based on the information in cloud profile 340 and adds the calculated cost to cloud profile 340 as discussed herein.

FIG. 6 is diagram depicting an example of a user interface that allows system administrator 360 to enter system administrator requirements. As those skilled in the art can appreciate, more, less, or different selections may be available to a system administrator other than those shown in FIG. 6. Some requirements, such as software cost, provide a sliding bar for a system administrator to select (sliding bar 610) and a value displayed in box 620, which may include a range. The system administrator may also specify whether the requirement is a fixed requirement (box 630) and/or a weighting (box 640). For example, if the system administrator has a fixed budget of $20,000, the system administrator would slide bar 610 to $20,000, which is displayed in value box 620, and select the corresponding FIXED box 630. In one embodiment, when a system administrator adjusts one of the requirements, other requirements may automatically adjust. For example, if a system administrator selects less hardware, the system administrator's capacity requirement may automatically decrease. In another embodiment, the system administrator enters requirements that include a weight or range for each configuration setting or usage scenario. For example, the system administrator may indicate that it is very important to set 'X' to a specific value; does not matter the value 'Y'; and 'Z' can range from 1-10.

Some complex requirements may have a "preferences" area for a system administrator to specify preferences and requirements, such as selection tools 650, 660, and 670 (e.g., drop-down menus, ability to add requirements, etc.). Selection tools 650, in one embodiment, may allow a system administrator to add additional hardware limitations and allow the system administrator to indicate whether the limitations are fixed or weighted. For example, a system administrator may need to use particular host hardware but also has access to an available router, which the system administrator may indicate is not a fixed requirement or assigns a lower weighting. Similarly, selection tools 660 and 670 may allow the system administrator to indicate preferences for pattern types/usages and public cloud provider restrictions. In one embodiment, the user interface options presented in user interface 600 may be dynamic in nature based on known data included in cloud profiles 340 stored in master crowd data repository 350 combined with other external data, such as a manufacturers' hardware statistics.

A system administrator may also select options in cloud preferences section 680 to select the type of cloud or physical location requirements of the cloud being created. For example, a system administrator may have requirements for a linked Disaster-Recovery site, or a completely On-Premise hardware vs Hybrid cloud (On-Premise linked to Public Cloud) solution.

Figure 7:
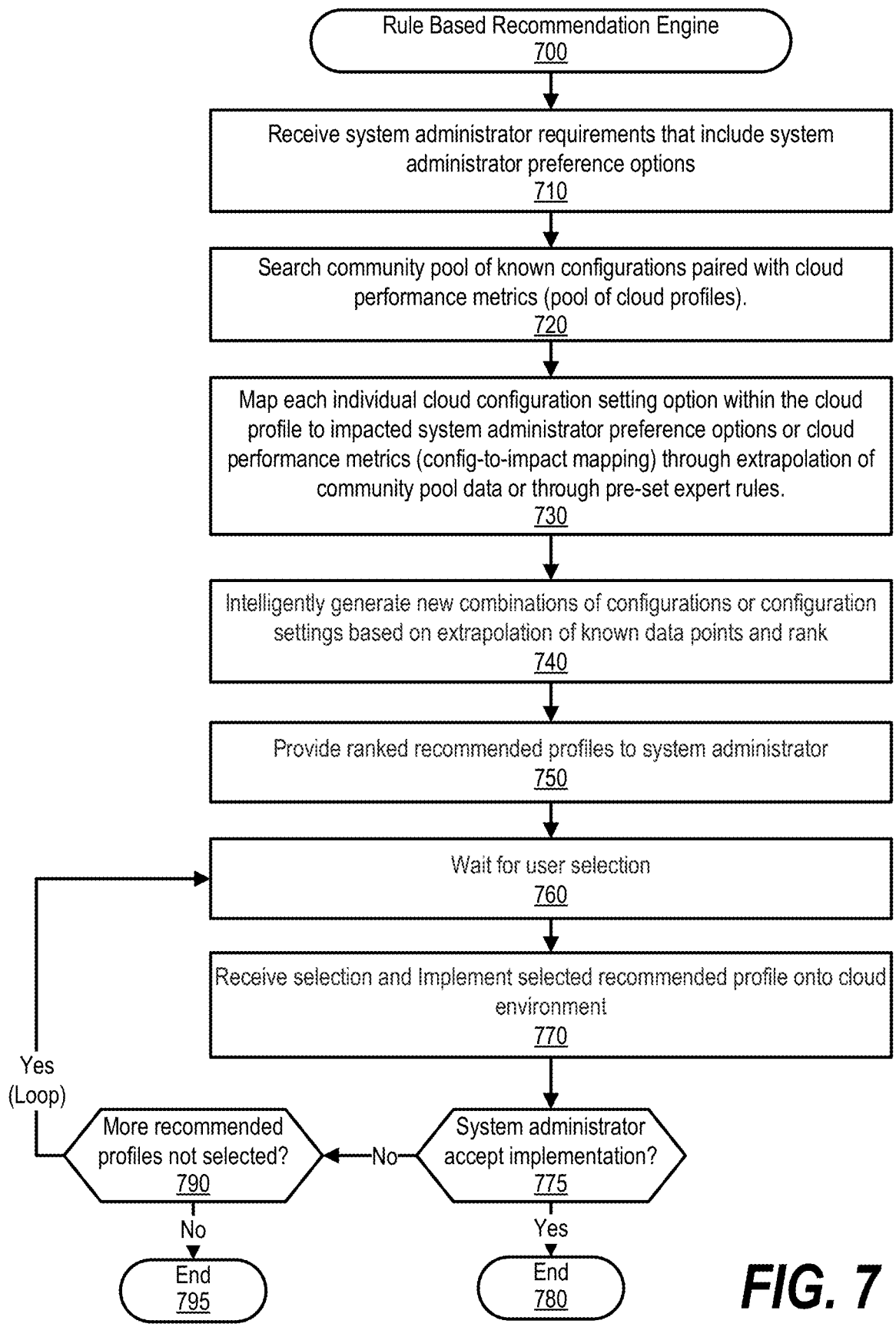
FIG. 7 is a flowchart depicting an example of steps taken to analyze system administrator requirements against cloud profiles and provide a recommended profile to a system administrator.

FIG. 7 is a flowchart depicting an example of steps taken to analyze system administrator requirements against cloud profiles and provide a recommended profile to a system administrator. FIG. 7 processing commences at 700 whereupon, at step 710, the process receives system administrator requirements that include system administrator preference options. At step 720, the process searches a community pool of known configurations paired with cloud performance metrics (cloud profiles 340 stored in master crowd data repository 350).

At step 730, the process, in one embodiment, uses machine logic based rules to map each individual cloud configuration setting option within the cloud profile to impacted system administrator preference options or cloud performance metrics through either extrapolation of community pool data or through pre-set expert rules. In one embodiment, each "configuration-to-impact mapping" includes multiple parts and may have statistically significant weights that are increased for each diverse profile containing the setting (see FIG. 8 and corresponding text for further details). In another embodiment, the process intelligently merges multiple similar cloud profile configurations and selects the best segments from each profile.

At step 740, the process intelligently generates new combinations of configurations or configuration settings based on extrapolation of known data points and ranks the new combinations/configurations based on the best match with the system administrator's requirements. For example, if the system administrator requirement is for fast VM deployment time, then the configuration settings that result in the fastest deployment time will be ranked highest.

At step 750, the process provides the ranked recommended profiles 390 to system administrator 360 and waits for system administrator selection at step 760. At step 770, the process receives a system administrator selection and, in one embodiment, implements the selected recommended profile onto the system administrator's cloud environment. In another embodiment, the system administrator may manually implement the recommendation.

The process determines as to whether the system administrator accepts the implementation (decision 775). If the system administrator accepts the implementation, then decision 775 branches to the 'yes' branch whereupon FIG. 7 processing thereafter ends at 780. On the other hand, if the system administrator does not accept the implementation, then decision 775 branches to the 'no' branch whereupon the process determines as to whether there are more recommended profiles that have not yet been selected by the system administrator (decision 790). If there are more recommended profiles to select, then decision 790 branches to the 'yes' branch, which loops back to wait for a system administrator selection and process the system administrator selection. In one embodiment, the system administrator ranked multiple recommendations and, in this embodiment, the process selects the next recommended profile based on the system administrator's rankings. On the other hand, if there are not any more recommended profiles to test, then decision 790 branches to the 'no' branch whereupon FIG. 7 processing thereafter ends at 795.

In one embodiment, recommendation engine 300 may iterate (through implementation) over the multiple recommended profiles and incorporate direct feedback from the implementations to focus on system administrator requirements in addition to feeding the data back into the pool. In this embodiment, the iterative looping may continue based on a system administrator's specifications such as a time limit; until specifications are reached; or until all recommendations are exhausted. In yet another embodiment, if a recommended profile is found to have a break (e.g., cannot be implemented due to a configuration error, or an option that is not possible due to a limitation), a rule may be added to indicate an impossible option (or combination of options) so the recommendation is not suggested in the future.

FIG. 8 is a diagram depicting examples of configuration-to-impact mappings, which are not intended to be limiting or fixed. In one embodiment, a configuration-to-impact mapping is a data structure that mathematically and/or logically describes how a change to one or more configuration variables will cause a change (impact) in one or more measurable metrics on a targeted cloud. The configuration-to-impact mappings may be continuously re-calculated as the dataset changes so that they always include the best-fitting mathematical model to the data. In addition, data-mining may be performed to identify trends in master crowd data repository 350 (e.g., a multi-variable data set) to programmatically define new configuration-to-impact mappings. The implementation or mathematical models of the configuration-to-impact mappings may be added to and improved upon over time as needed (manually or programmatically) or after further data analysis.

Each "configuration-to-impact mapping" may include multiple sections and may have statistically significant weights that are increased for each diverse profile containing a setting. Mapping 810 is based on a cloud group High Availability (HA) requiring two or more compute nodes in a group based on an expert rule. Mapping 810 includes a configuration, an impact, relationships, and weightings.

Mapping 820 maps a CPU increase to deploy speed. Example data from profiles that created the mapping may be:
Profile 1: CPU speed on host=10 Core @ 2 Ghz; deploy times=50 sec, 60 sec, 55 sec . . . .
Profile 2: CPU speed on host=10 Core @ 3 Ghz; deploy times=40 sec, 50 sec, 35 sec . . . .

Mapping 830 maps hardware cost to storage capacity. Example data from profiles that created the mapping may be:
Profile 1: storage size=3 TB; calculated cost=$800; SSD speed=3000 IOPS; vendor=Vendor A . . . .
Profile 2: storage size=1 TB; calculated cost=$400; HDD speed=500 IOPS; vendor=Vendor B . . . .

In one embodiment, each configuration-to-impact mapping has a "causality" weight that is increased based on the diversity (and similarity) of profiles that includes the setting. For example, if multiple similar profiles exist with minor differences, then recommendation engine 300 determines that the mappings are strong and notes causality of the differences in cloud performance metrics between the profiles.

As can be appreciated from the foregoing discussion, some embodiments of the present invention automatically set configuration parameters, and, more specifically, some embodiments of the present invention automatically set cloud environment configuration parameters (see definition of this term, above). Some types of cloud environment configuration parameters include: (i) cloud scheduler related (for example, distributed resource scheduler (DRS): enable, disable, set automation level, set power management, set management threshold); (ii) cloud resource availability level related (for example, High Availability (HA): enable, disable, set failure rules and responses for each rule such as: host failure, host isolation, datastore loss, datastore path down); (iii) cloud-based virtual storage related (for example, Virtual storage area network (SAN) enable, disable, set deduplication and compression, define a stretched cluster, define a fault domain); (iv) cloud platform related (for example, Platform configuration: Edge virtual machine (VM) creation, number of Edge VMs, placement of Edge VMs, firewall settings, routing settings, network address translation (NAT) rules, Load Balancing settings); (v) cloud-based virtual machine (VM) related (for example, VM affinity rules, anti-affinity rules for each VM, VM type, or VM cluster, Definition of VM clusters—number of VMs in each cluster, and cluster settings, VM CPU resource shares and limits per cluster, VM Memory resource shares and limits per cluster, VM swap file location); (vi) cloud-based compute node related (for example, Number of Compute Nodes per cluster); (vii) Authentication services configuration and Single-Sign-On configuration (note: this refers to authentication(s) and/or sign on(s) required to access cloud resources rather than local sign-on and/or authentication that may be required locally at a user's device or (non-cloud style) local area network); and (xii) cloud gateway and/or switch related (for example, virtual switch usage and configuration: configuration of uplinks, multicast filtering mode, maximum transmission unit (MTU) setting).

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles. "Requirements," as that term is used herein, is hereby defined to be broad enough to cover both absolutely necessary requirements and mere preferences.

The invention claimed is:

1. A method implemented by an information handling system that includes a memory and a processor, the method comprising:
displaying a user interface comprising a plurality of cloud environment configuration parameters on a display, wherein each of the plurality of cloud environment configuration parameters is selectable by a user and corresponds to a new cloud environment;
receiving a first user selection comprising a first value of a first one of the plurality of cloud environment configuration parameters, a fixed indicator to keep the first cloud environment configuration parameter at the first value, and a weighting indicator to add weighting to a second one of the plurality of cloud environment configuration parameters:
identifying a relationship between the first cloud environment configuration parameter and the second cloud environment configuration parameter, wherein the relationship determines whether a change to at least one of the parameters will impact the other parameter to cause a change in one or more measurable metrics in the new cloud environment;
in response to receiving the fixed indicator and identifying the relationship between the first cloud environment configuration parameter and the second cloud environment configuration parameter, automatically adjusting a second value of the second cloud environment configuration parameter based on the first value and the weighting indicator;

generating a recommended cloud profile based, at least in part, on the first value and the second value; and configuring the new cloud environment based on the recommended cloud profile.

2. The method of claim 1, further comprising:

receiving a set of performance metrics corresponding to a set of existing cloud environments;

receiving a set of expert rankings corresponding to the set of existing cloud environments; and adjusting the recommended cloud profile based on the set of cloud performance metrics and the set of expert rankings.

3. The method of claim 1, further comprising:

displaying a cloud preferences section on the user interface that allows the user to select at least one cloud type of the new cloud environment and at least one physical location requirement of the new cloud environment.

4. The method of claim 1 wherein at least one of the plurality of cloud environment configuration parameters comprise a complex requirement preference selected from the group consisting of a hardware limitation preference, a pattern type/usage preference, and a public cloud provider restriction preference.

5. The method of claim 1 wherein at least one of the plurality of cloud environment configuration parameters is selected from the group consisting of a software cost, a hardware cost, a quality of service, a high availability of workloads, a high availability of cloud management, a deployment time, a required number of deployments, and a required amount of storage.

6. An information handling system comprising: one or more processors;

a memory coupled to at least one of the processors;

a set of computer program instructions stored in the memory and executed by at least one of the processors in order to perform actions of:

displaying a user interface comprising a plurality of cloud environment configuration parameters on a display, wherein each of the plurality of cloud environment configuration parameters is selectable by a user and corresponds to a new cloud environment;

receiving a first user selection comprising a first value of a first one of the plurality of cloud environment configuration parameters, a fixed indicator to keep the first cloud environment configuration parameter at the first value, and a weighting indicator to add weighting to a second one of the plurality of cloud environment configuration parameters;

identifying a relationship between the first cloud environment configuration parameter and the second cloud environment configuration parameter, wherein the relationship determines whether a change to at least one of the parameters will impact the other parameter to cause a change in one or more measurable metrics in the new cloud environment;

in response to receiving the fixed indicator and identifying the relationship between the first cloud environment configuration parameter and the second cloud environment configuration parameter, automatically adjusting a second value of the second cloud environment configuration parameter based on the first value and the weighting indicator;

generating a recommended cloud profile based, at least in part, on the first value and the second value; and configuring the new cloud environment based on the recommended cloud profile.

7. The information handling system of claim 6 wherein the processors perform additional actions comprising:

receiving a set of performance metrics corresponding to a set of existing cloud environments;

receiving a set of expert rankings corresponding to the set of existing cloud environments; and adjusting the recommended cloud profile based on the set of cloud performance metrics and the set of expert rankings.

8. The information handling system of claim 6 wherein the processors perform additional actions comprising:

displaying a cloud preferences section on the user interface that allows the user to select at least one cloud type of the new cloud environment and at least one physical location requirement of the new cloud environment.

9. The information handling system of claim 6 wherein at least one of the plurality of cloud environment configuration parameters comprise a complex requirement preference selected from the group consisting of a hardware limitation preference, a pattern type/usage preference, and a public cloud provider restriction preference.

10. The information handling system of claim 6 wherein at least one of the plurality of cloud environment configuration parameters is selected from the group consisting of a software cost, a hardware cost, a quality of service, a high availability of workloads, a high availability of cloud management, a deployment time, a required number of deployments, and a required amount of storage.

11. A computer program product stored in a computer readable storage medium, comprising computer program code that, when executed by an information handling system, causes the information handling system to perform actions comprising:

displaying a user interface comprising a plurality of cloud environment configuration parameters on a display, wherein each of the plurality of cloud environment configuration parameters is selectable by a user and corresponds to a new cloud environment;

receiving a first user selection comprising a first value of a first one of the plurality of cloud environment configuration parameters, a fixed indicator to keep the first cloud environment configuration parameter at the first value, and a weighting indicator to add weighting to a second one of the plurality of cloud environment configuration parameters;

identifying a relationship between the first cloud environment configuration parameter and the second cloud environment configuration parameter, wherein the relationship determines whether a change to at least one of the parameters will impact the other parameter to cause a change in one or more measurable metrics in the new cloud environment;

in response to receiving the fixed indicator and identifying the relationship between the first cloud environment configuration parameter and the second cloud environment configuration parameter, automatically adjusting a second value of the second cloud environment configuration parameter based on the first value and the weighting indicator;

generating a recommended cloud profile based, at least in part, on the first value and the second value; and configuring the new cloud environment based on the recommended cloud profile.

12. The computer program product of claim 11 wherein the information handling system performs further actions comprising:
  receiving a set of performance metrics corresponding to a set of existing cloud environments;
  receiving a set of expert rankings corresponding to the set of existing cloud environments; and
  adjusting the recommended cloud profile based on the set of cloud performance metrics and the set of expert rankings.

13. The computer program product of claim 11 wherein the information handling system performs further actions comprising:
  displaying a cloud preferences section on the user interface that allows the user to select at least one cloud type of the new cloud environment and at least one physical location requirement of the new cloud environment.

14. The computer program product of claim 11 wherein at least one of the plurality of cloud environment configuration parameters comprise a complex requirement preference selected from the group consisting of a hardware limitation preference, a pattern type/usage preference, and a public cloud provider restriction preference.

* * * * *